(12) United States Patent
Kshirsagar et al.

(10) Patent No.: US 7,600,679 B2
(45) Date of Patent: Oct. 13, 2009

(54) AUTOMATIC GUIDANCE OF VISITOR IN NEW FACILITY THROUGH ACCESS CONTROL SYSTEM INTEGRATION WITH LCD DISPLAY

(75) Inventors: Sachin R. Kshirsagar, Karnataka (IN); Ramesh Subbaiah, Karnataka (IN); Siva Subbiah, Hyderabad (IN)

(73) Assignee: Honeywell International Inc., Morristown, NJ (US)

( * ) Notice: Subject to any disclaimer, the term of this patent is extended or adjusted under 35 U.S.C. 154(b) by 111 days.

(21) Appl. No.: 11/776,260

(22) Filed: Jul. 11, 2007

(65) Prior Publication Data

US 2009/0014516 A1 Jan. 15, 2009

(51) Int. Cl.
*G06K 5/00* (2006.01)
*G06F 17/00* (2006.01)
(52) U.S. Cl. .................. 235/382; 235/375; 235/380
(58) Field of Classification Search ............. 235/375, 235/380, 382
See application file for complete search history.

(56) References Cited

U.S. PATENT DOCUMENTS

| 6,069,555 | A | 5/2000 | Skitek et al. |
| 6,127,945 | A | 10/2000 | Mura-Smith |
| 6,164,531 | A | 12/2000 | Harris et al. |
| 6,418,372 | B1 | 7/2002 | Hofmann |
| 6,924,741 | B2 * | 8/2005 | Tamayama et al. ........ 340/572.1 |
| 7,375,634 | B2 * | 5/2008 | Sprague .................. 340/572.1 |
| 2005/0033962 | A1 | 2/2005 | Libin et al. |
| 2007/0164102 | A1 * | 7/2007 | Haertel ...................... 235/380 |

* cited by examiner

*Primary Examiner*—Thien M. Le
*Assistant Examiner*—April A Taylor
(74) *Attorney, Agent, or Firm*—Husch Blackwell Sanders Welsh & Katz

(57) ABSTRACT

An automatic guidance system and method directs a person in a defined area. An access control device includes a selectively encoded readable element. An access control device reader is adapted to read the element of the access control device and selectively deny or allow a user access to a predetermined location. A communication device included in the access control device reader directs the user to the predetermined location.

22 Claims, 3 Drawing Sheets

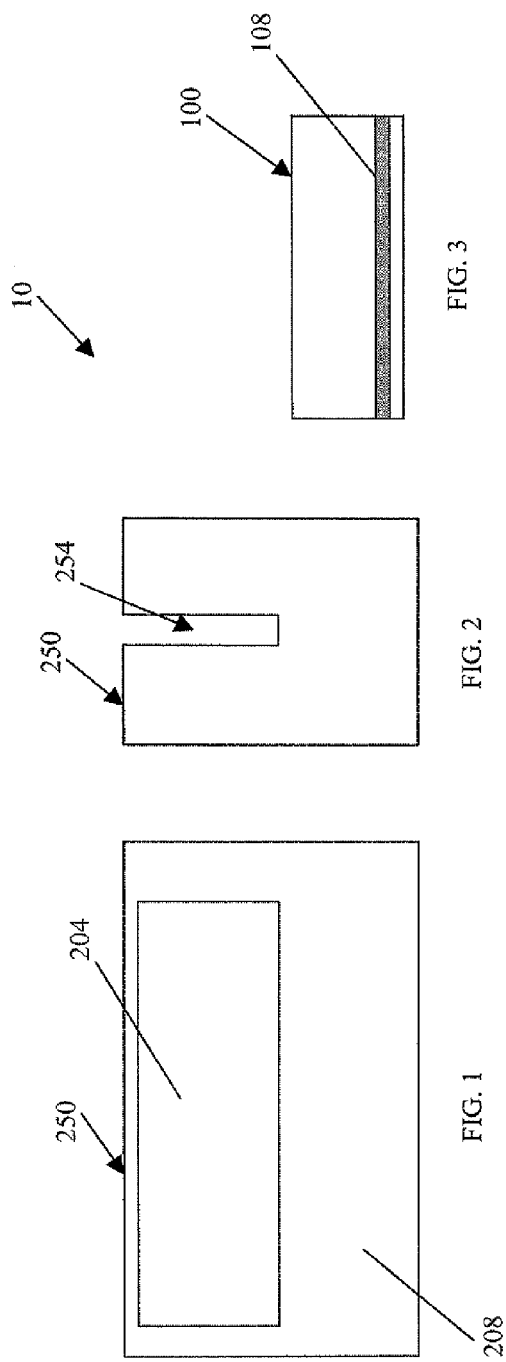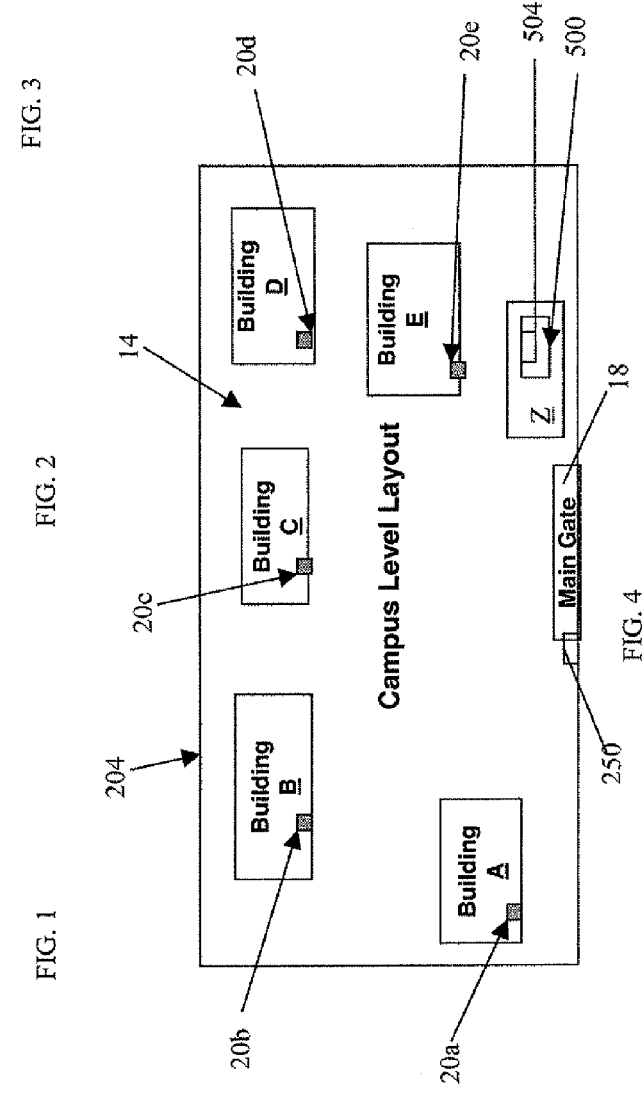

AUTOMATIC GUIDANCE OF VISITOR IN NEW FACILITY THROUGH ACCESS CONTROL SYSTEM INTEGRATION WITH LCD DISPLAY

FIELD OF THE INVENTION

The present invention relates to automatic guidance systems for directing a person in a defined area and, more specifically, relates to an automatic guidance system including an access control device and an access control device reader for selectively allowing the person access to a predetermined location and communicating directions to the predetermined location.

BACKGROUND OF THE INVENTION

Visitors to a multiplicity of locations, for example, buildings, campuses, large events such as fairs, conferences or trade shows, shopping malls, airports, amusement parks, museums, or libraries, have to find their way to a desired location with some or no prior knowledge about the location, Some public places display signs and maps to help the visitor to his/her destination, however, these signs or floor plan displays can be confusing. Typically, a visitor needs to ascertain their position and orientation on the floor plan or map, find their destination on the map, and possibly memorize the path to the destination.

A typical electronic visitor guidance system may guide a user to a selected one of multiple locations in a defined area. The system includes a portable device for each user and multiple mounted indicators. The indicators include an infrared transceiver The indicators also include direction signs, and directional information corresponding to the relative direction in a path from the indicator to one or more selected locations in the defined area. The portable device directly communicates the information corresponding to the selected location via the device infrared transceiver to the indicator infrared transceiver. The indicator accesses the directional information and activates an appropriate mounted direction sign to guide the user toward the selected location.

However, disadvantages with the above system include the user having to be in range of the mounted visual indicator for the system to work. Also, if the floor plan changes the visual indicators may not be located in convenient places and thus need to be physically moved requiring time and labor costs, Further, the portable device's signal to the visual indicators may be disrupted or malfunction.

It would therefore be desirable to have an improved guidance system which is less confusing, simple to use, economical, and does not require the need for a human guide.

SUMMARY OF THE INVENTION

In an aspect of the invention, an automatic guidance system for directing a person to a specific area comprises an access control device including a selectively encoded readable element. An access control device reader reads the encoded readable element and denies or allows a user access to a predetermined location controlled by the reader. A communication device included in the access control device reader provides a message directing the user to the predetermined location when the user is allowed access to the predetermined location controlled by the reader.

In a related aspect, the communication device is a display using visual directions for directing the user to the predetermined location.

In a related aspect, the access reader is adapted to read the element of the access device when the access device is swiped through the access reader.

In a related aspect, the access device is a card including a magnetic strip communicating with the access reader.

In a related aspect, the access reader is adapted to read the readable element of the access card when the access card is proximate the access reader and without touching the reader.

In a related aspect, the access reader display visually directs the user the predetermined location by depicting a map.

In a related aspect, the access reader includes a sound emitting element for directing the user to the predetermined location.

In a related aspect, the sound emitting element further communicates verbal directions to the user.

In a related aspect, the access device is encoded to allow the user access to multiple locations at different times.

In a related aspect, the access control reader includes a microprocessor which is programmed to depict a plurality of messages on the display in response to reading the access device.

In a related aspect, the display of the access reader includes a liquid crystal display.

In a related aspect, the access reader includes a microcontroller storing access information and visual displays, and is programmed to display a plurality of messages and communicate with the access device.

In a related aspect, the access device is encoded to allow the user access to multiple locations at different times and the access control device reader is located at each of the multiple locations.

In a related aspect, the message is a first message and the system further includes a control device for remotely communicating with the access control device reader for providing a second message to the user when the user is allowed access to the predetermined location controlled by the reader.

In another aspect of the invention, a method of automatically guiding a person in a defined area comprises encoding an access control device for a user; reading the access control device using an access control device reader when the user presents the access control device to the device reader for reading; selectively denying or allowing the user presenting the access control device access to a predetermined location; and communicating a message including directions to the user for reaching the predetermined location using the access control device reader when the user is allowed access to the predetermined location.

In a related aspect, the method further includes displaying the directions for directing the user to the predetermined location.

In a related aspect, the step of reading the access control device includes swiping a card access control device through a slot in the access control device reader for reading a magnetic strip on the card.

In a related aspect, the step of reading the access device includes waving the access control device proximate the access control device reader without touching the access control device reader.

In a related aspect, the step of communicating includes emitting verbal directions to the user.

In a related aspect, the method further includes presenting the access control device to multiple access control device readers at a plurality of location to provide the user access to each of the plurality of locations.

In a related aspect, the method further includes processing the access or denial of the user presenting the access control"

device for reading by the access control device reader using a microcontroller in the access control device reader, and displaying a directional aid to communicate directions to the user.

In a related aspect, the method further includes programming the microcontroller to display the directional aid corresponding to the access control device encoding.

In a related aspect, the message is a first message and the method further includes communicating a second message to the user when the user is allowed access to the predetermined location controlled by the reader.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 1 is a block diagram according to an embodiment of the present invention depicting an access card reader including a display;

FIG. 2 is a side view of the access card reader shown in FIG. 1 depicting a swiping slot;

FIG. 3 is rear elevational view of an access card depicting a magnetic strip;

FIG. 4 is a block diagram of a campus level layout or display depicting a main gate and a plurality of buildings;

DETAILED DESCRIPTION OF THE INVENTION

Figure 5:
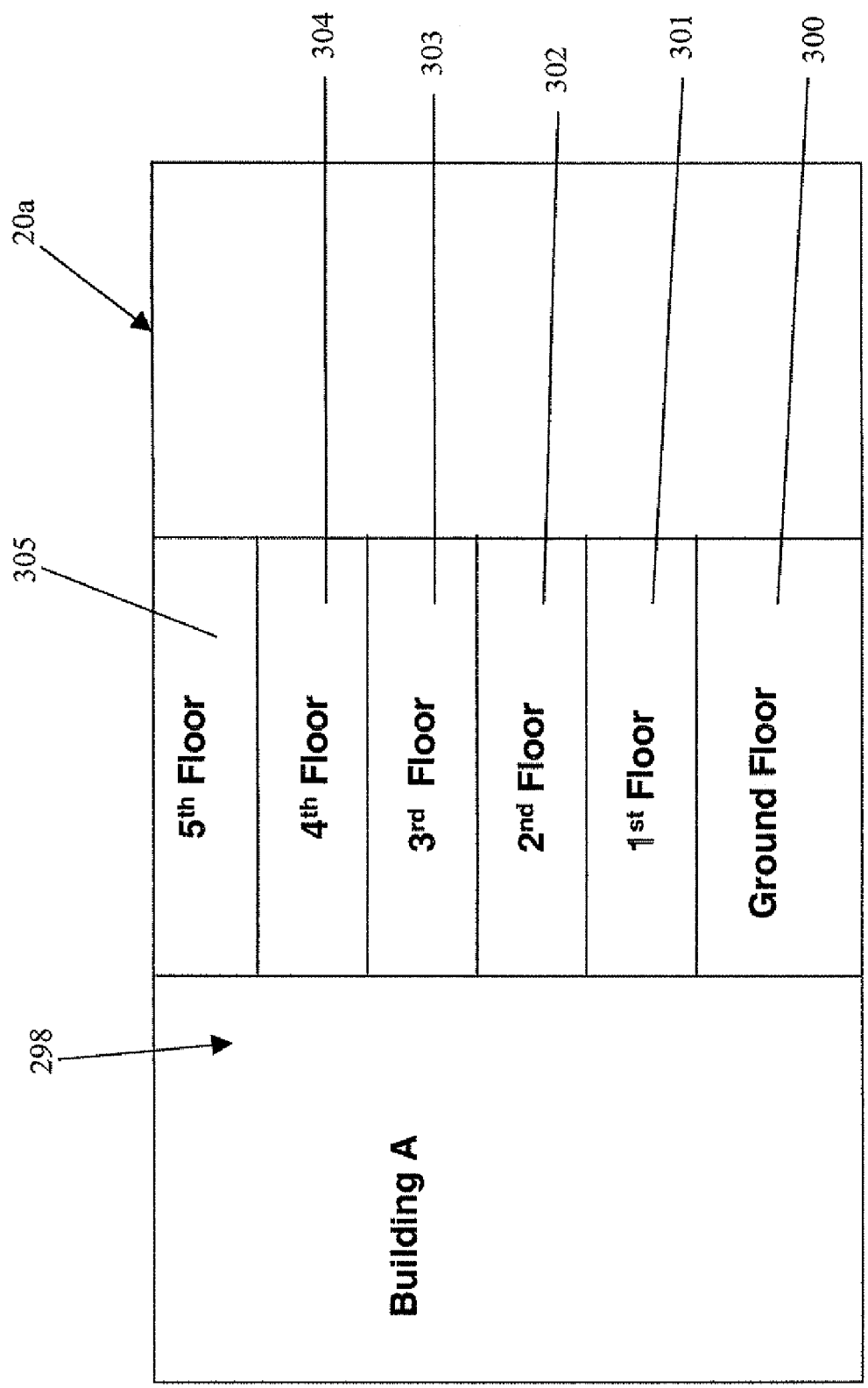
FIG. 5 is a block diagram of the inside of one of the buildings shown in FIG. 4 depicting a plurality of floors.

Referring to FIGS. 1-3, an exemplary embodiment of an automatic guidance system 10 according to the present invention includes an access control device reader 250 including a communication device embodied as a liquid-crystal display (LCD) 204. The LCD 204 is located on a substantially planar surface 208 of the reader 250. The reader includes a slot 254 for reading information stored on the access control device. In one example, the access control device is an access card 100 having a selectively encoded readable element embodied as a magnetic strip 108 adapted to be swiped through the slot 254 in the reader. The magnetic strip 108 on the card 100 is read by the reader 250 which allows or denies access at any security junction of a facility. In addition, if access is permitted, directions to a specified location within the facility will be displayed on the LCD 204. Numerous access cards 100 may be reserved for visitors to the facility.

For example, if a visitor is given an access card 100 and swipes the access card 100 in the slot 254 of the access control device reader 250. The LCD display 204 integrated with the access control device reader 250 will display a map of the next step of the visit, i.e., the segment of the trip to the next access card reader or final destination. The map may be, for example, a campus level depiction, a particular building layout, a floor plan, road system, a network of paths, directions including arrow and words, a message using symbols, words, or a combination.

In the exemplary embodiment shown in FIG. 4, the LCD display 204 displays a campus level layout plan 14 for viewing by the visitor. In another embodiment, an access control device reader 250 may also include, for example, an infrared reader where the card may be waived in front of the reader for scanning, or other devices providing a similar reading capability to determine access of the visitor by allowing or denying access to, for example, a facility, building, or room. In an exemplary embodiment, the building entrances 20a-20e of Buildings A-E each include access control device readers 250.

Figure 6:
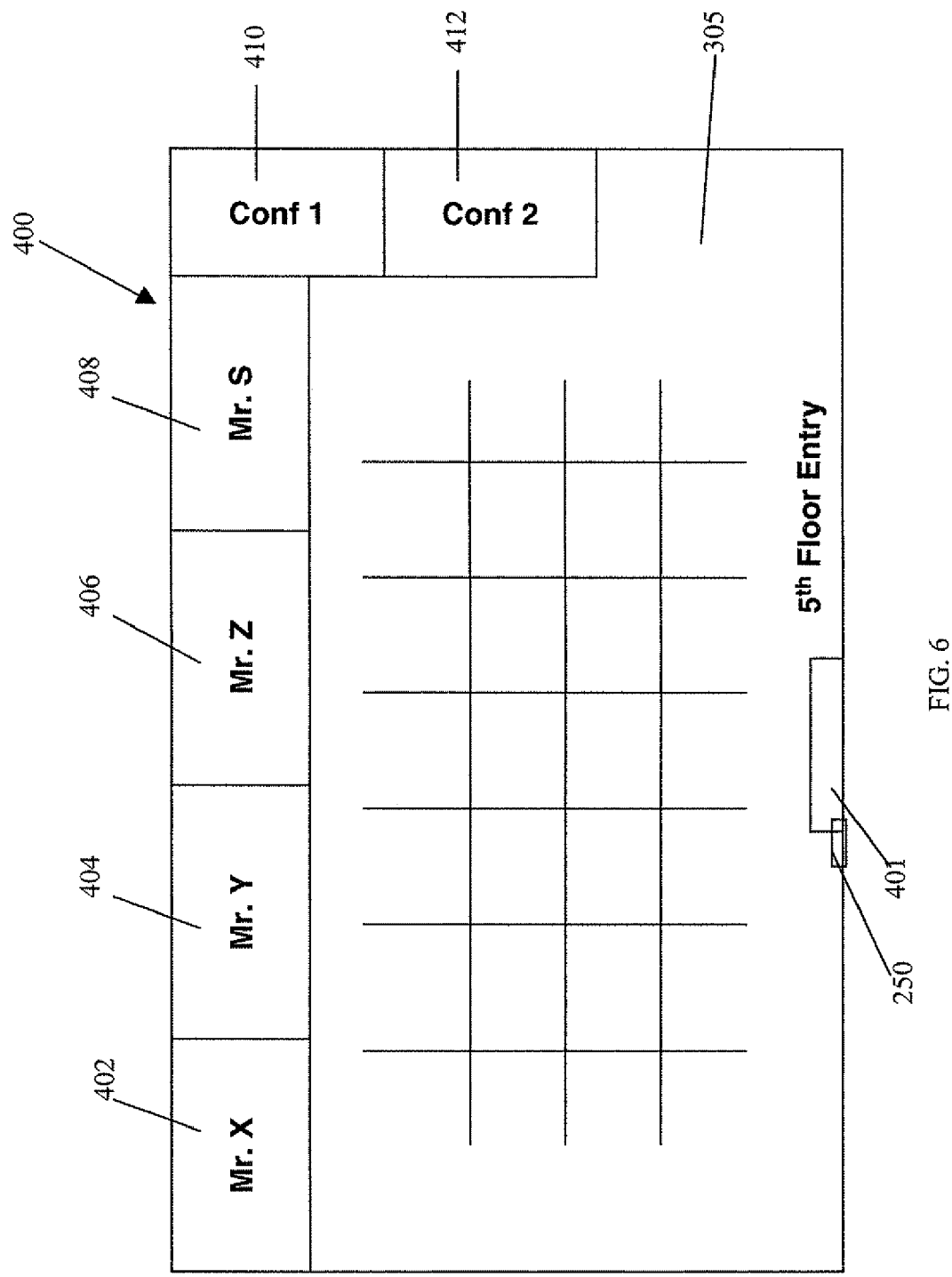
FIG. 6 is a block diagram of one of the floor plans in the building shown in FIG. 5.

Once the visitor has entered the campus 14 the visitor can enter a building or be allowed access beyond a check point within the building using the same procedure of swiping the card 100 in an access device 250. Referring to FIG. 5, the visitor has swiped the card 100 at Building A, and the LCD 204 displays a floor plan 298. The floor plan 298 shows the floors in the building. In this embodiment, the LCD 204 will display a floor level layout plan depicting, for example, rooms, hallways, entrances, exits, and stairwells. Furthermore, an access control device 250 can also be positioned to control access to each floor. FIG. 6 depicts a floor plan for the $5^{th}$ floor. The automatic guidance system 10 may be used in conjunction with an existing access control system with none, or minimal human intervention for guiding the visitors.

In another exemplary embodiment of the automatic guidance system 10 according to the present invention a visitor is given an access card that is encoded for a specific route through a campus, to a specific building, to a specific floor, and a specific room on that floor. The access card allows access to all doors en route so the visitor can reach the destination in a secure campus. The access card reader 250 includes a microcontroller or microprocessor for storing display information and card access information.

In a first example, referring to FIGS. 4-6, a visitor wants to meet a person or host, in this case, Mr. X who sits in Building A on the fifth floor 305 (shown in FIG. 5) in a specific office 402 (shown in FIG. 6). When the visitor reaches the campus or facility 14 and enters the main gate 18, they disclose the person to meet, in this case, Mr. X 402. The visitor is given an access card 100 programmed to open the doors and access buildings necessary to meet Mr. X 402. The visitor swipes the card 100 at the main gate 18 access card reader 250. The LCD 204 integrated with the card reader 250 displays the campus level layout 14 which shows the different buildings and their names A-E. The display may also depict where the visitor is currently located and the best route to their destination. The access control reader LCD displays maps, and visual queues, such as arrows. The access control reader can also include a sound emitting element, for example, a speaker for communicating voice commands to direct the visitor.

Referring to the campus level layout 14 shown in FIG. 4, the LCD 204 will flash the building, in this example, Building A, for which the visitor card is programmed. Thus, the visitor will have a directional guide as to which building to proceed to. When the visitor reaches Building A, there is another access card reader 250 at entrance 20a where the visitor will swipe the card 100 through the access card reader 250 to enter into the building. The LCD device 204 integrated with the reader 250 at entrance 20a displays a floor level plan 298 of the Building A as shown in FIG. 5.

Referring to FIG. 5, a floor level plan of Building A is displayed for the user on the LCD 204 of the access device 250. The LCD 204 flashes the floor the user intends to proceed to, in this example, the fifth floor 305 is flashed so the user knows to proceed to the fifth floor in Building A. Upon reaching the fifth floor 305 the user swipes the access card 100 through another reader 250 to enter the fifth floor area, shown in FIG. 6.

Referring to FIG. 6, once the user swipes the access card 100 through the access device 250 the user is allowed entry to the fifth floor 305 through the fifth floor entry 401. The floor plan 400 of the fifth floor 305 is displayed on the LCD 204 of the access reader 250, The LCD 204 flashes the room where the visitor is to meet their party or host so that the user can simply follow the floor plan to the desired office. Thus, the user reaches their destination without the help of any security guard or any human interaction.

In another example, two visitors, visitor 1 and visitor 2, visit a facility to meet two different people in the facility. The facility operator gives both visitors different access control cards 100. Visitor 1 swipes the card 100 at an access reader 250 at the main gate 18, as shown in FIG. 4. The LCD 204 of the reader 250 displays the campus level layout 14, shown in FIG. 4. Similarly visitor 2 swipes their access card 100 at the main gate 18 to display the campus level layout 14 on the LCD 204 of the reader 250. Visitors 1 and 2 reach their respective parties in a similar manner as described above. At any point in the process of reaching their destination, the LCD) 204 may display info such as "Call 8888 for more info" if the visitor needs additional assistance navigating to their destination, or any other message which will help the visitor to locate the desired party or navigate a particular area. In another example, if the access card is mistakenly not encoded, the LCD 204 of the reader 250 can display a message such as "invalid card—call security at 9999".

In another example, a visitor may want to meet different people in different buildings in the same facility. In this scenario, the access control device/card reader is programmed for time sensitive acceptance or denial of the card to allow or deny the visitor access. For example, if the visitor is meeting Mr. X 402 on the fifth floor 305 in Building A between 9:30 am to 11:30 am, then the visitor is meeting person J in Building E between 11:45 am to 12:45 pm, the visitor will reach person X in Building A as discussed above in the first example. However, when the meeting with person X is complete, the visitor will proceed to meet person J in Building E. The visitor swipes the access card at the exit of Building A and a campus level layout will be displayed on the LCD 204 with Building E flashing. The visitor can then proceed to building E to meet person J within the designated time slot in a similar manner as described above in the first example. If the visitor tries to meet with person J before the programmed time, access will be denied.

Another possible scenario includes where a visitor mistakenly tries to enter the wrong building. In this case, a visitor who wants to go to Building A and has their access card programmed accordingly. When the visitor swipes the card 100 at the access control device reader at the main gate 18 a campus level layout 14 is displayed and Building A flashes to direct the user to Building A. Unlike the first example, however, the visitor mistakenly goes to Building D. When the visitor tries to enter Building D by swiping at an access reader, the LCD 204 of the reader 250 shows the campus level layout 14 (FIG. 3) with a message indicating that the visitor is at the wrong building and will also flash Building A to direct the visitor to the correct building. Additionally, if the visitor repeatedly tries to access Building D after receiving the message indicating that they are at the wrong building, the device reader signals security personnel of the visitors repeated attempts at unauthorized access to Building D. Security personnel can then take appropriate action, for example, escorting the visitor to the correct location. Thus, the present invention as exemplified above is easier to use than maps because the route information is provided only at the time the user needs the information and thus can be more easily remembered and used by the visitor. Further, the present invention is less expensive than a human guide.

Another embodiment of the present invention includes a dynamic update feature. In this embodiment, the readers 250 are connected to a control system 500 in, for example, an administrative or security Building Z, or in a data center or security area within a building. The central unit can communicate with the readers 250 via a wireless communication signal from a transceiver 504 or, for example, communicate using a wired network. Thus, a message from the control system 500 can be sent to a reader to inform a visitor swiping a card 100 that, for example, a change of plans has occurred, e.g., change of a meeting location, time or cancellation. Further, the access card 100 does not need the magnetic strip 108 to be re-encoded since the display message is changed remotely using the control system.

For example, a visitor has a scheduled meeting with hosts in Buildings A and E. While the visitor is meeting in Building A, the host from building E needs to delay the time of their scheduled meeting. The host can call an administrator to change the message the floor or building access reader 250 will display when the visitor swipes their card 100 to alert the visitor that the meeting is delayed, and to please wait. The administrator changes the message by using the control system 500 to re-program a reader to display a chosen message when the visitor's access card 100 is swiped. It is understood that other messages and variations of the above can also be accomplished by this method, such as canceling a meeting, suggesting alternatives, displaying an alternate telephone number to reach the host, displaying a message at entry of the building or when the visitor reaches a specific floor in a building.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An automatic guidance system for directing a person to a specific area, which comprises:
    an access control device including a selectively encoded readable element;
    an access control device reader for reading the encoded readable element and denying or allowing a user access to a first predetermined location controlled by the access control device reader; and
    a communication device included in the access control device reader for providing a message directing the user to the first predetermined location when the user is allowed access to the first predetermined location controlled by the access control device reader and directing the user to a second predetermined location when the user is denied access and the specific area is in the second predetermined location.

2. The system of claim 1, wherein the communication device is a display using visual directions for directing the user to the second predetermined location.

3. The system of claim 1, wherein the access control device reader reads the element of the access device when the access control device is swiped through the access control device reader.

4. The system of claim 1, wherein the access control device is a card including a magnetic strip communicating with the access control device reader.

5. The system of claim 1, wherein the access control device reader reads the encoded readable element of an access card when the access card is proximate the access control device reader and without touching the access control device reader.

6. The system of claim 1, further comprising an access reader display visually directs the user to the second predetermined location by depicting a map.

7. The system of claim 1, wherein the access control device reader includes a sound emitting element for directing the user to the second predetermined location.

8. The system of claim 7, wherein the sound emitting element further communicates verbal directions to the user.

9. The system of claim 1, wherein the access control device is encoded to allow the user access to multiple locations at different times.

10. The system of claim 1, wherein the access control device reader includes a microprocessor which is programmed to depict a plurality of messages sequentially or concurrently on a display in response to reading the access control device.

11. The system of claim 10, wherein the display of the access control device reader includes a liquid crystal display.

12. The system of claim 1, wherein the access control device reader includes a microcontroller storing access information and visual displays, and programmed to display a plurality of messages and communicate with the access control device.

13. The system of claim 1, wherein the access control device is encoded to allow the user access to multiple locations at different times and the access control device reader is located at each of the multiple locations.

14. The system of claim 1, wherein the message is a first message and the system further includes: a control device for remotely communicating with the access control device reader for providing a second message to the user when the user is allowed access to the second predetermined location controlled by the access control device reader.

15. A method of automatically guiding a person to a specific location in a defined area, comprising:
encoding an access control device for a user;
reading the access control device using an access control device reader when the user presents the access control device to the access control device reader for reading;
selectively denying or allowing the user presenting the access control device access to a first predetermined location;
communicating a first message including first directions to the user for reaching the first predetermined location using the access control device reader when the user is allowed access to the first predetermined location; and
communicating a second message including second directions to the user for reaching the specific location when the user is denied access and the specific location is in second predetermined location.

16. The method of claim 15, further including: displaying the first directions for directing the user to the first predetermined location.

17. The method of claim 15, wherein the step of reading the access control device includes swiping a card access control device through a slot in the access control device reader for reading a magnetic strip on the card access control device.

18. The method of claim 15, wherein the step of reading the access control device includes waving the access control device proximate the access control device reader without touching the access control device reader.

19. The method of claim 15, wherein the step of communicating includes emitting verbal directions to the user.

20. The method of claim 15, further including: presenting the access control device to multiple access control device readers at a plurality of locations to provide the user access to each of the plurality of locations.

21. The method of claim 15, further including: processing the access or denial of the user presenting the access control device for reading by the access control device reader using a microcontroller in the access control device reader; and displaying a directional aid to communicate directions to the user.

22. The method of claim 21, further including programming the microcontroller to display the directional aid corresponding to the access control device encoding.

* * * * *